US012113457B2

United States Patent
Aoyagi et al.

(10) Patent No.: US 12,113,457 B2
(45) Date of Patent: Oct. 8, 2024

(54) ELECTRIC-POWER CONVERTER

(71) Applicant: TMEIC Corporation, Chuo-ku (JP)

(72) Inventors: Kazuki Aoyagi, Tokyo (JP); Issei Fukasawa, Tokyo (JP)

(73) Assignee: TMEIC CORPORATION

( * ) Notice: Subject to any disclaimer, the term of this patent is extended or adjusted under 35 U.S.C. 154(b) by 0 days.

(21) Appl. No.: 18/005,765

(22) PCT Filed: Oct. 28, 2020

(86) PCT No.: PCT/JP2020/040428
§ 371 (c)(1),
(2) Date: Jan. 17, 2023

(87) PCT Pub. No.: WO2022/091249
PCT Pub. Date: May 5, 2022

(65) Prior Publication Data
US 2023/0318485 A1    Oct. 5, 2023

(51) Int. Cl.
*H02M 7/493* (2007.01)
*H02H 7/12* (2006.01)
*H02M 1/00* (2006.01)
*H02S 40/32* (2014.01)

(52) U.S. Cl.
CPC .......... *H02M 7/493* (2013.01); *H02H 7/1213* (2013.01); *H02M 1/0009* (2021.05); *H02S 40/32* (2014.12)

(58) Field of Classification Search
CPC ...... H02M 7/493; H02M 1/0009; H02M 1/32; H02H 7/1213; H02H 7/122; H02S 40/32; H02S 40/30; H02J 3/38

USPC .......................................................... 307/52
See application file for complete search history.

(56) References Cited

FOREIGN PATENT DOCUMENTS

WO    WO 2012/023209 A1    2/2012

OTHER PUBLICATIONS

International Search Report & Written Opinion issued Dec. 22, 2020 in PCT/JP2020/040428 filed on Oct. 28, 2020, 10 pages (with partial English Translation).

*Primary Examiner* — Richard Tan
(74) *Attorney, Agent, or Firm* — Oblon, McClelland, Maier & Neustadt, L.L.P.

(57) ABSTRACT

An electric-power converter includes a plurality of direct-current power supplies, a plurality of power conversion circuits provided corresponding to the respective direct-current power supplies, an alternating-current power system configured to cause a plurality of alternating-current ends provided in the respective power conversion circuits to be directly connected in parallel through a parallel connection point, and to supply the alternating-current power output from the plurality of alternating-current ends to an alternating-current side through the parallel connection point, a plurality of grounding wires each configured to connect at least two of a plurality of direct-current negative buses between the plurality of direct-current power supplies and the plurality of power conversion circuits, to earth, and a plurality of diodes inserted in series into the respective grounding wires, and each including a cathode side connected to the corresponding direct-current negative bus and an anode side grounded.

20 Claims, 6 Drawing Sheets

V3=max(V1, V2)

ELECTRIC-POWER CONVERTER

FIELD

The present invention relates to an electric-power converter.

BACKGROUND

A power conversion system including a plurality of system interconnection electric-power converters in which alternating-current sides are directly connected in parallel, and direct-current sides are independent, has been known. In such a power conversion system, negative electrode sides of the respective electric-power converters connected to direct-current power supplies are grounded in some cases (for example, see PTL 1).

CITATION LIST

Patent Literature

[PTL 1] WO 2012/023209

SUMMARY

Technical Problem

In a case where a grounding method is a direct grounding method, when difference is generated among direct-current voltages of the plurality of electric-power converters, the difference causes potential difference among the negative electrodes of the electric-power converters. As a result, a cross current may flow through grounding wires.

When the cross current flows, a current flowing through each of electric components in the electric-power converters is increased by a flowing amount of the cross current. As a result, the current flowing through each of the electric components may become an overcurrent. Therefore, it is necessary to determine a rated current of each of the electric components greater than usual in consideration of the cross current. Further, when the cross current flows, a controller may erroneously detect the cross current as ground fault.

An object of the present invention is to provide a technique that reduces, in a case where negative electrode sides are grounded in an electric-power converter including a plurality of power conversion circuits in which alternating-current sides are directly connected in parallel and direct-current sides are independent, possibility that a cross current flows through grounding wires, as compared with an existing technique.

Solution to Problem

An electric-power converter according to an aspect of the present invention includes: a plurality of direct-current power supplies; a plurality of power conversion circuits provided corresponding to the respective direct-current power supplies, and configured to receive, from direct-current ends, direct-current power supplied from the respective corresponding direct-current power supplies through direct-current buses and to convert the direct-current power into alternating-current power; an alternating-current power system configured to cause a plurality of alternating-current ends provided in the respective power conversion circuits to be directly connected in parallel through a parallel connection point, and to supply the alternating-current power output from the plurality of alternating-current ends to an alternating-current side through the parallel connection point; a plurality of grounding wires each configured to connect at least two of a plurality of direct-current negative buses between the plurality of direct-current power supplies and the plurality of power conversion circuits, to earth; and a plurality of diodes inserted in series into the respective grounding wires, and each including a cathode side connected to the corresponding direct-current negative bus and an anode side grounded.

The electric-power converter according to the aspect may further include: a plurality of current detectors configured to detect currents flowing through the respective diodes; and a control unit configured to monitor the currents detected by the plurality of current detectors.

The electric-power converter according to the aspect may further include a plurality of first breakers inserted in series into the respective direct-current buses, and configured to disconnect the respective direct-current buses. When any of the plurality of current detectors detects the current, the control unit may issue an open operation instruction to the plurality of first breakers.

The electric-power converter according to the aspect may further include a plurality of second breakers inserted into the respective grounding wires in series to the respective diodes, and configured to disconnect the respective grounding wires. When any of the plurality of current detectors detects the current, the control unit may issue an open operation instruction to the plurality of second breakers.

The electric-power converter according to the aspect may further include third breakers inserted into respective electric paths of the alternating-current power system, and configured to disconnect the respective electric paths. When any of the plurality of current detectors detects the current, the control unit may issue an open operation instruction to the third breakers.

The electric-power converter according to the aspect may further include: a plurality of fuses inserted into the respective grounding wires in series to the respective diodes, and configured to be blown out when a current greater than or equal to a predetermined threshold flows through the respective diodes; a plurality of voltage detectors configured to detect potential variations of the direct-current power at the respective direct-current ends; and a control unit configured to monitor the potential variations detected by the plurality of voltage detectors when the fuses are blown out.

The electric-power converter according to the aspect may further include a plurality of first breakers inserted in series into the respective direct-current buses, and configured to disconnect the respective direct-current buses. When any of the plurality of voltage detectors detects the potential variation, the control unit issues an open operation instruction to the plurality of first breakers.

The electric-power converter according to the aspect may further include a plurality of second breakers inserted into the respective grounding wires in series to the respective diodes, and configured to disconnect the respective grounding wires. When any of the plurality of voltage detectors detects the potential variation, the control unit may issue an open operation instruction to the plurality of second breakers.

The electric-power converter according to the aspect may further include third breakers inserted into respective electric paths of the alternating-current power system, and configured to disconnect the respective electric paths. When any of the plurality of voltage detectors detects the potential variation, the control unit issues an open operation instruction to the third breakers.

The electric-power converter according to the aspect may further include: a plurality of fuses inserted into the respective grounding wires in series to the respective diodes, and configured to be blown out when a current greater than or equal to a predetermined threshold flows through the respective diodes; a plurality of switches provided in the respective fuses, and configured to be opened when the fuse provided with the switch itself is blown out; and a control unit configured to monitor open operation of the switches.

In the electric-power converter according to the aspect, the direct-current power supplies may be solar cells.

Advantageous Effects of Invention

According to the present invention, in the case where the negative electrode sides are grounded in the electric-power converter including the plurality of power conversion circuits in which the alternating-current sides are directly connected in parallel and the direct-current sides are independent, it is possible to reduce a possibility that the cross current flows through the grounding wires, as compared with the existing technique.

DESCRIPTION OF EMBODIMENTS

Some embodiments of an electric-power converter according to the present invention are described below with reference to drawings.

First Embodiment

Figure 1:
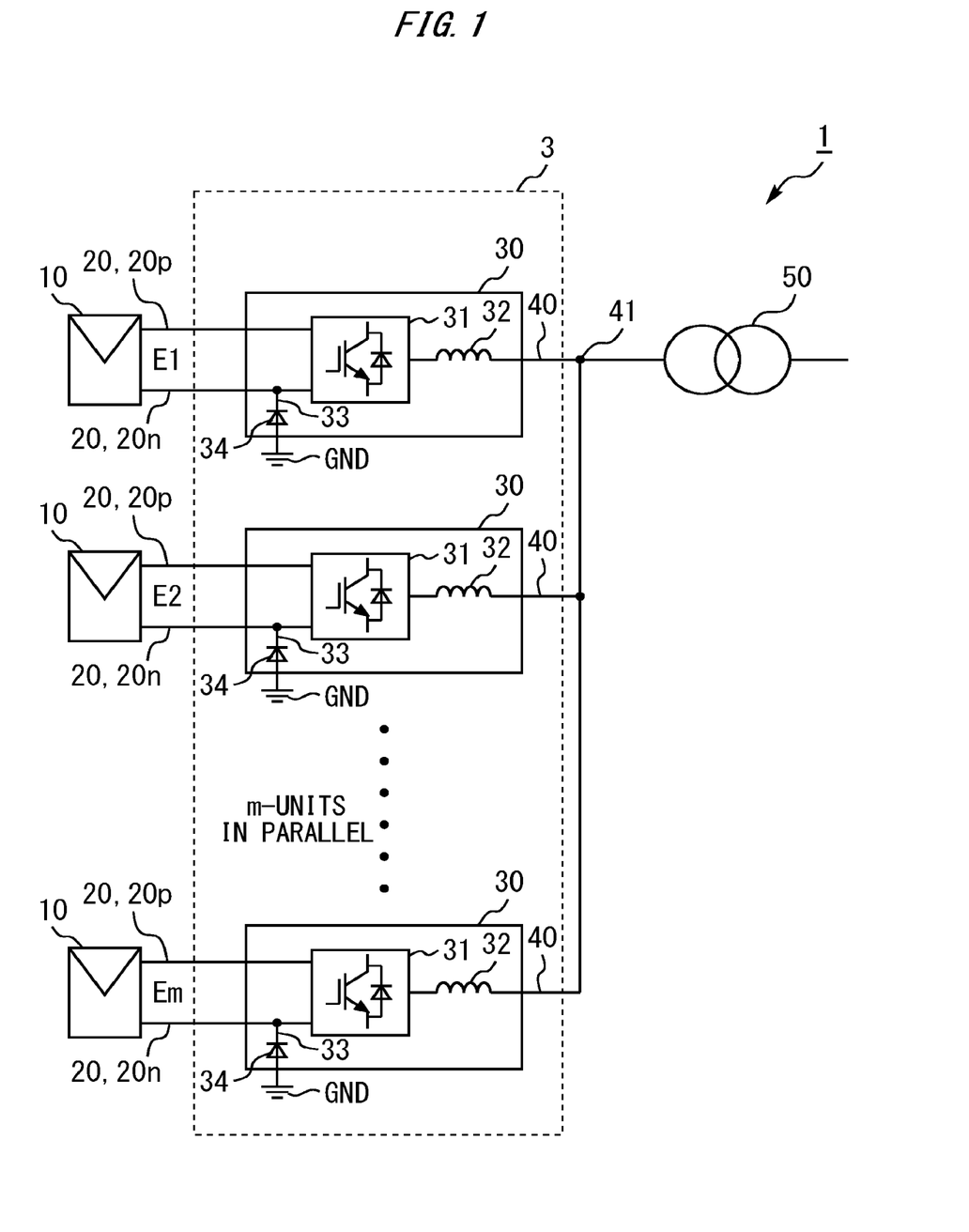
FIG. 1 is a diagram illustrating configuration of electric-power converters and a power conversion system including the electric-power converters according to a first embodiment.

FIG. 1 is a diagram illustrating configurations of electric-power converters 30 and a power conversion system 1 including the electric-power converters 30 according to a first embodiment.

The power conversion system 1 includes m direct-current power supplies 10, m electric-power converters 30, and an interconnection transformer 50. As illustrated in FIG. 1, the power conversion system 1 according to the embodiment illustrated in FIG. 1 includes the plurality of electric-power converters 30 (system interconnection electric-power converter 3) in which alternating-current sides are directly connected in parallel through a parallel connection point 41 and direct-current sides are independent. In other words, one direct-current power supply 10 and one electric-power converter 30 are connected one on one, and m sets of direct-current power supply 10 and electric-power converter 30 are provided. The m electric-power converters 30 configure the system interconnection electric-power converter 3. Note that m is an optional positive integer of two or more. Alternating-current ends of the respective electric-power converters 30 are merged at the parallel connection point 41 provided in electric paths 40, and are connected to one end of the interconnection transformer 50. The m electric-power converters 30 (system interconnection electric-power converter 3) are an example of an electric-power converter of the claims.

The direct-current power supplies 10 are, for example, solar cell panels, solar cell modules, or solar cell arrays (hereinafter, also simply referred to as "solar cells"), and supply direct-current power to the respective electric-power converters 30. The direct-current power supplies 10 may be rechargeable batteries, or may be direct-current power supply systems each including an aerogenerator and an alternating current-direct current converter. Each of the direct-current power supplies 10 has a direct-current voltage E. The plurality of direct-current power supplies 10 do not always have the exact same direct-current voltage E. Therefore, for convenience, the direct-current voltages are distinguished by being referred to as direct-current voltages E1, E2, ..., Em in some cases.

Each of the electric-power converters 30 includes a power conversion circuit 31, an alternating-current reactor 32, a grounding wire 33, and a diode 34. The electric-power converters 30 convert direct-current power supplied from the respective direct-current power supplies 10, into alternating-current power. Note that the electric-power converters 30 are also referred to as inverter units, power conditioners, or power conditioning subsystems (PCSs).

The power conversion circuits 31 are also referred to as inverter circuits or simply referred to as inverters, and each include a plurality of switching elements such as IGBTs (Insulated Gate Bipolar Transistors). The power conversion circuits 31 each include an unillustrated inverter control circuit that generates a pulse width modulation signal as a gate driving signal of each of the switching elements. Direct-current ends of the power conversion circuits 31 are connected to the respective direct-current power supplies 10 through direct-current positive buses 20p and direct-current negative buses 20n (hereinafter, also collectively referred to as "direct-current buses 20"). Alternating-current ends of the power conversion circuits 31 are connected to the respective alternating-current reactors 32. The power conversion circuits 31 receive, by the direct-current ends, the direct-current power supplied from the respective direct-current power supplies 10 through the direct-current buses 20, convert the direct-current power into alternating-current power, and output the alternating-current power from the alternating-current ends.

The alternating-current reactors 32 have one ends connected to the respective power conversion circuits 31, and the other ends connected to the interconnection transformer 50 through the parallel connection point 41 of the electric paths 40. The alternating-current reactors 32 on the output sides of the power conversion circuits 31 have an effect of reducing noise and an effect of suppressing a serge voltage, more than usual.

The grounding wires 33 have one ends connected to the respective direct-current negative buses 20n between the direct-current power supplies 10 and the electric-power converters 30, and have the other ends grounded to the earth GND. For example, in a case where the direct-current power supplies 10 are solar cells, the grounding wires 33 are provided as countermeasures for a PID (Potential Induced Degradation) phenomenon. The PID phenomenon is a phenomenon in which, when a ground potential of a negative electrode of a solar cell is increased toward a negative side in a solar power generation system, the solar cell is deteriorated. If the PID phenomenon occurs, a power generation quantity of the solar cell is significantly lowered as compared with a normal state. Accordingly, for example, in the case where the direct-current power supplies 10 are the solar cells, the grounding wires 33 ground the negative electrode sides of the respective electric-power converters 30 connected to the direct-current power supplies 10 as the countermeasure for such a PID phenomenon.

Note that, in the embodiment illustrated in FIG. 1, it is sufficient for the grounding wires 33 to ground the negative electrode sides of at least two electric-power converters 30, and it is unnecessary to provide the grounding wires 33 for all of the direct-current negative buses 20n connected to all of the electric-power converters 30. For example, in a case where the direct-current power supplies 10 are rechargeable batteries, necessity of the countermeasure for the PID phenomenon is low as compared with the case where the direct-current power supplies 10 are the solar cells. Therefore, in a case where the solar cells and the rechargeable batteries are both used as the direct-current power supplies 10, no grounding wire 33 may be provided in a system using the rechargeable battery. Further, even in a case where all of the direct-current power supplies 10 are the solar cells, grounding is optional, and necessity of grounding depends on countries. Therefore, a system not including the grounding wire 33 may be present.

The diodes 34 are inserted in series into the respective grounding wires 33, cathode sides of the diodes 34 are connected to the direct-current negative buses 20n, and anode sides thereof are grounded to the earth GND. The diodes 34 are electron elements each having a rectification function allowing a current to flow in a predetermined direction from the anode side toward the cathode side. Therefore, in a case where the diodes 34 are provided in the respective grounding wires 33 in directions illustrated in FIG. 1, the currents flow only from the earth GND on the anode sides toward the direct-current negative buses 20n on the cathode sides, and the currents are blocked and do not flow from the direct-current negative buses 20n on the cathode sides toward the earth GND on the anode sides.

The electric paths 40 have one ends connected to the alternating-current ends of the respective power conversion circuits 31 and merged at the parallel connection point 41, and the other ends connected to the interconnection transformer 50. The electric paths 40 are paths supplying the alternating-current power converted by the respective electric-power converters 30 to the interconnection transformer 50. Note that the electric paths 40 serve as parts of current paths of a cross current 60 described below in some cases (see FIG. 2).

The interconnection transformer 50 has one end connected to the electric-power converters 30 through the parallel connection point 41, and the other end connected to an alternating-current power system. Since the interconnection transformer 50 is provided on the alternating-current side of the parallel connection point 41, the alternating-current power output from the electric-power converters 30 is merged at the parallel connection point 41, and the merged alternating-current power is supplied to the alternating-current power system through the interconnection transformer 50.

Figure 2:
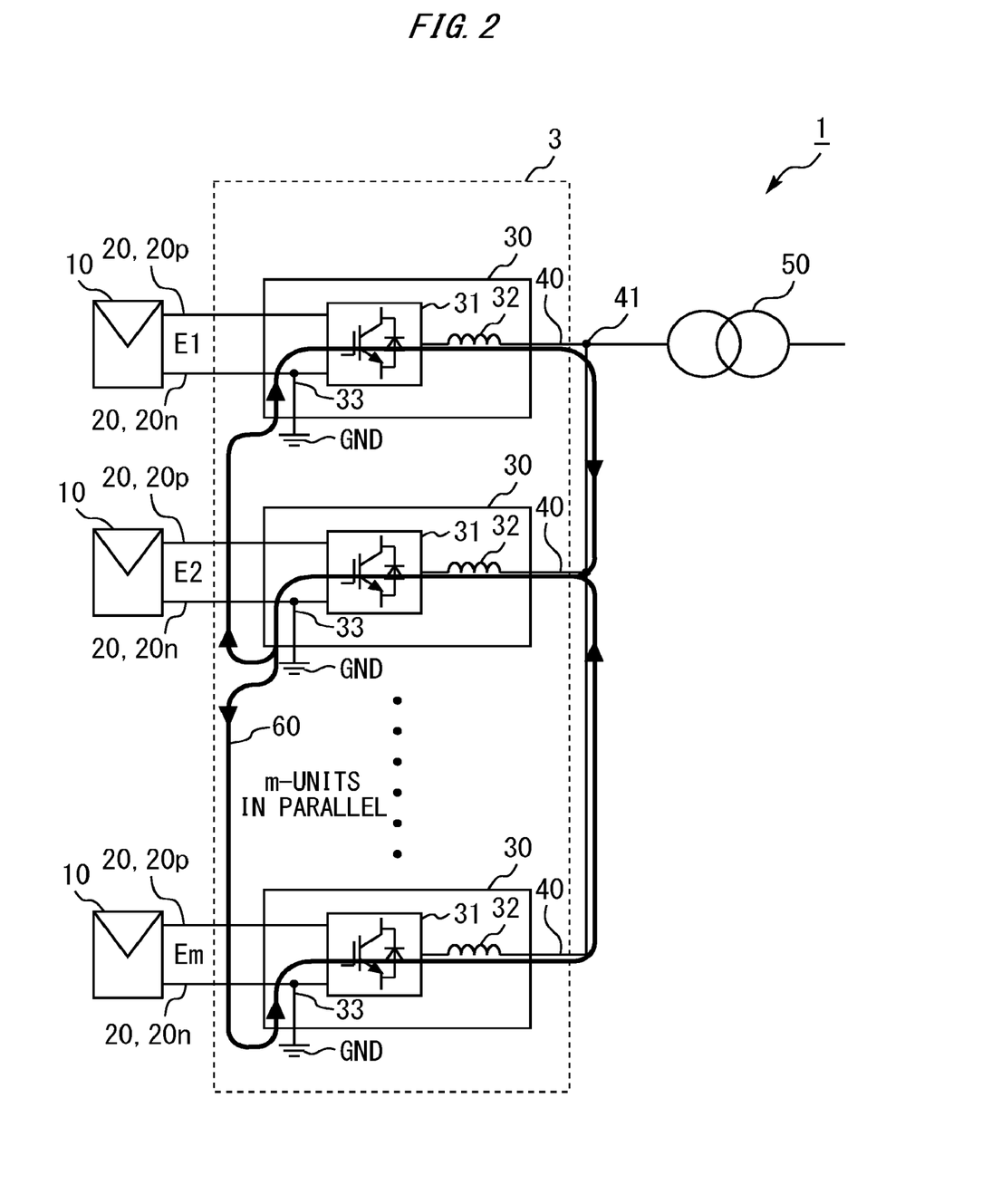
FIG. 2 is a diagram illustrating an example of a state where a cross current flows due to direct grounding of negative electrode sides, as a comparative example of the embodiment illustrated in FIG. 1.

FIG. 2 is a diagram illustrating an example of a state where the cross current 60 flows due to direct grounding of the negative electrode sides, as a comparative example of the embodiment illustrated in FIG. 1. Note that, in FIG. 2, the components same as in FIG. 1 are denoted by the same reference numerals as in FIG. 1, and detailed descriptions of the components are omitted. In FIG. 2, the diode 34 is not inserted into each of the grounding wires 33, and the grounding wires 33 are directly grounded. In FIG. 2, a direct-current voltage E1 of the electric-power converter 30 at an upper part in the drawing and a direct-current voltage Em of the electric-power converter 30 at a lower part in the drawing are lower than a direct-current voltage E2 of the electric-power converter 30 at a center in the drawing. As illustrated in FIG. 2, in a case where a grounding method of the grounding wires 33 is a direct grounding method, when difference is generated among the direct-current voltages E of the electric-power converters 30, the difference causes potential difference among the negative electrodes of the electric-power converters 30. As a result, the cross current 60 may flow through the grounding wires 33 and the electric paths 40. When the cross current 60 flows, problems such as an overcurrent and erroneous detection of ground fault may occur as described above.

In contrast, in the embodiment illustrated in FIG. 1, the diodes 34 are inserted into the respective grounding wires 33. In the configuration illustrated in FIG. 1, in a case where the cross current 60 tries to flow through the grounding wires 33, a portion where the current flows from the cathode side toward the anode side of the diode 34 surely exists in the path of the cross current 60 (see grounding wire 33 at center in FIG. 2). However, the current flowing from the cathode side to the anode side of the diode 34 is blocked by the rectification function of the diode 34. Therefore, the cross current 60 does not flow through that portion.

Further, in the case where the direct-current power supplies 10 are the solar cells, the PID phenomenon in which, when the ground potential of the negative electrode of the solar cell is increased toward the negative side, the solar cell is deteriorated is known as described above. For example, in a case where the direct-current power supplies 10 are the solar cells and the electric-power converters 30 each perform independent MPPT (Maximum power point tracking) control, difference is generated among the direct-current voltages of the electric-power converters 30 by difference among quantities of solar radiation to the solar cells. In this case, the PID phenomenon in which the ground potential of the negative electrode of the solar cell is increased toward the negative side, and the solar cell is deteriorated may occur. Note that the MPPT control (Maximum power point tracking control) indicates a control function to take a current at an output voltage at which power from the solar cell becomes maximum.

As the countermeasures therefor, it is considered that the negative electrode sides of the electric-power converters 30 connected to the solar cells are grounded. However, in the case where the grounding method is the direct grounding method as in the comparative example illustrated in FIG. 2, when difference is generated among the direct-current voltages E of the electric-power converters 30, the difference causes potential difference among the negative electrodes of the electric-power converters 30. As a result, the cross current 60 flows through the grounding wires 33. Therefore, in a case where the countermeasures for the overcurrent caused by the cross current 60 are not taken in the electric-power converters 30, the negative electrode sides of the electric-power converters 30 connected to the solar cells cannot be grounded as the countermeasures for the PID phenomenon.

In contrast, in the example illustrated in FIG. 1, the diode 34 that has the cathode side connected to the corresponding direct-current negative bus 20n and the anode side grounded to the earth GND is inserted into each of the grounding wires 33. Therefore, the ground potentials of the negative electrodes are clamped and do not become negative. Here, meaning of clamp in the embodiment illustrated in FIG. 1 is described.

Figure 3:
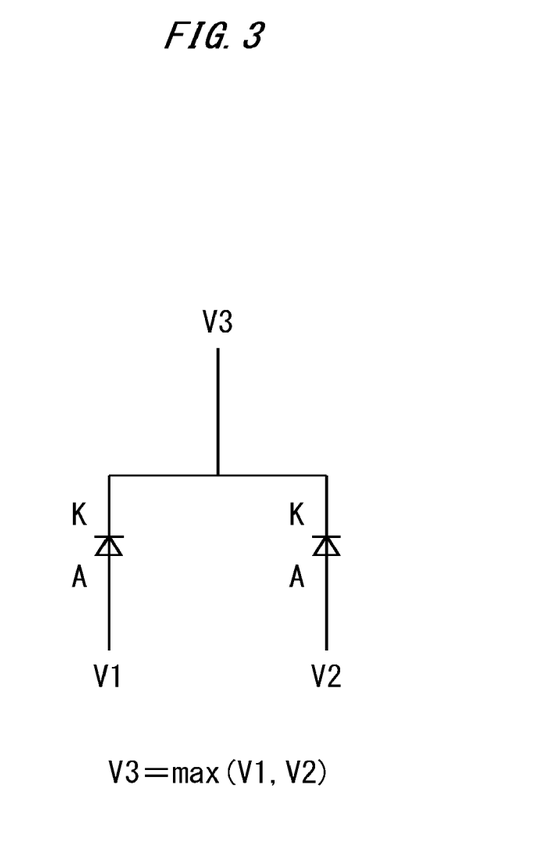
FIG. 3 is a diagram illustrating an example of functions of diodes.

FIG. 3 is a diagram illustrating an example of functions of diodes. As illustrated in FIG. 3, a case where anode sides of two diodes are separated and cathode sides are made common, voltages on the anode sides are set to V1 and V2, and a voltage on the cathode side is set to V3 is considered. It is known that a cathode side of a diode has a function of selecting the maximum voltage. Therefore, in this case, the maximum voltage of the voltage V1 and the voltage V2 is selected as the voltage V3. In other words, in this case, it is known that an expression V3=max(V1, V2) is established by the function of the diode.

In the embodiment illustrated in FIG. 1, the anode sides of all of the diodes 34 are grounded to the earth GND. Therefore, the minimum potential of a plurality of potentials of the negative electrodes connected to the cathode sides of the diodes 34 becomes equal to the ground potential. Even if the potential of the negative electrode of a certain electric-power converter 30 is varied in a minus direction relative to the ground potential, the potential does not become 0 V or less because short-circuit is generated by the rectification function of the diode 34. In contrast, when the potential of the negative electrode of the certain electric-power converter 30 becomes high relative to the ground potential, this is blocked by the rectification function of the diode 34, and the circuit does not act.

As a result, in the embodiment illustrated in FIG. 1, among the plurality of negative electrodes, the negative electrode having the lowest potential is conductive to the earth GND, and the anode side and the cathode side of the diode 34 corresponding to the negative electrode become the same potential. On the other hand, among the plurality of negative electrodes, the negative electrodes other than the negative electrode being conductive are each higher in potential than the negative electrode being conductive. Therefore, the currents are blocked by the rectification function of the respective diodes 34, and no current flows. In the embodiment illustrated in FIG. 1, such a state is called a clamped state.

In the embodiment illustrated in FIG. 1, the diodes 34 are inserted in series into the respective grounding wires 33, the cathode sides of the diodes 34 are connected to the direct-current negative buses 20n, and the anodes sides thereof are grounded to the earth GND (0 V). Therefore, the ground potentials of the negative electrodes are clamped by the above-described functions of the diodes 34, and the ground potentials of the negative electrodes do not become negative (0 V or less). Accordingly, in the embodiment illustrated in FIG. 1, in the case where the direct-current power supplies 10 are the solar cells, occurrence of the PID phenomenon in which, when the ground potential of the negative electrode of the solar cell is increased toward the negative side, the solar cell is deteriorated, can be suppressed as compared with the existing technique.

As described above, in the embodiment illustrated in FIG. 1, the diodes 34 are provided. Therefore, even in the case where the negative electrode sides are grounded in the plurality of electric-power converters 30 in which the alternating-current sides are directly connected in parallel and the direct-current sides are independent, it is possible to reduce a possibility that the cross current 60 flows, as compared with the existing technique. Further, in the embodiment illustrated in FIG. 1, in the case where the direct-current power supplies 10 are the solar cells, deterioration of the solar cells can be reduced by the functions of the diodes 34 as compared with the existing technique.

Second Embodiment

Next, an embodiment different from the embodiment illustrated in FIG. 1 is described.

Figure 4:
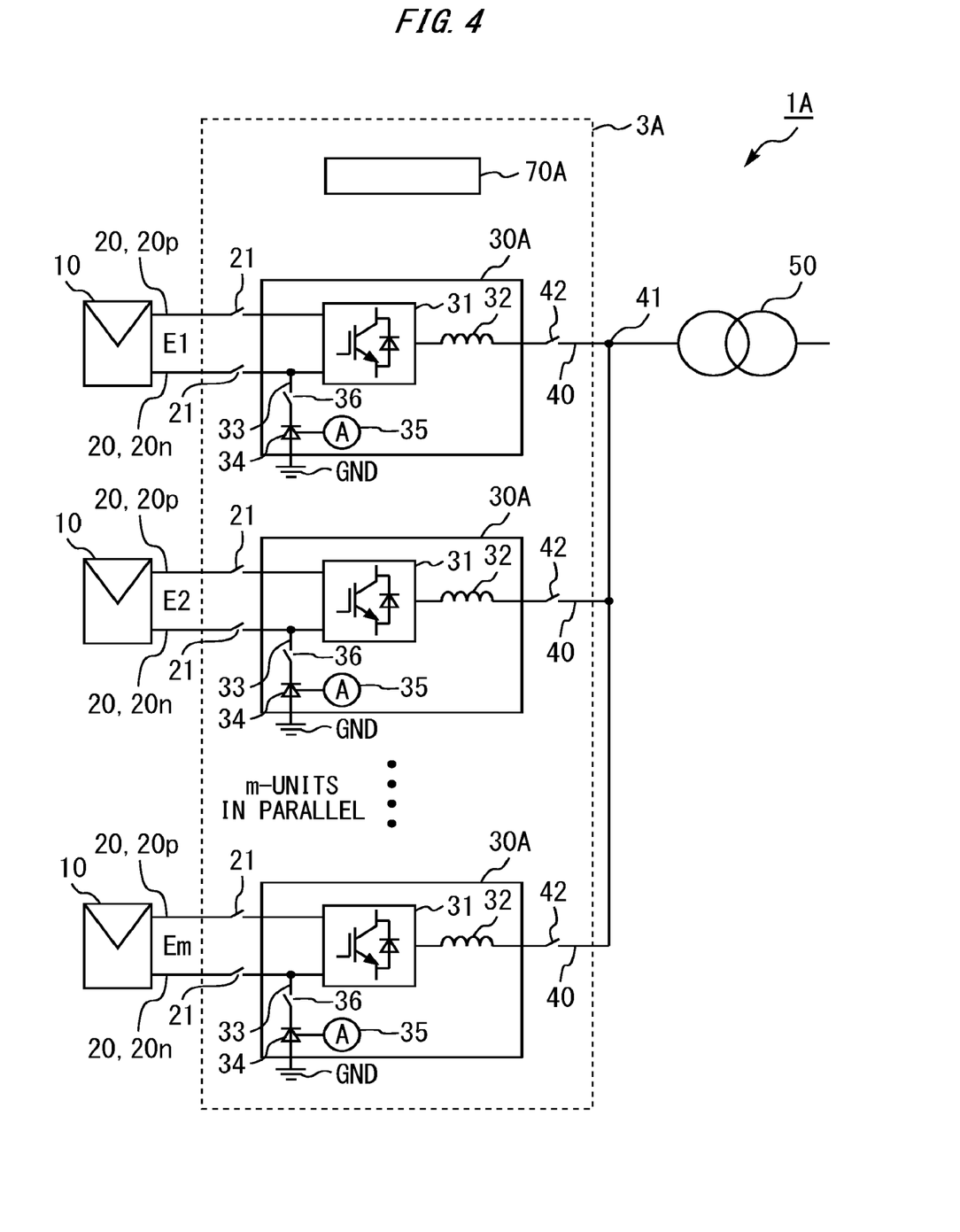
FIG. 4 is a diagram illustrating configurations of electric-power converters and a power conversion system including the electric-power converters according to a second embodiment.

FIG. 4 is a diagram illustrating configurations of electric-power converters 30A and a power conversion system 1A including the electric-power converters 30A according to a second embodiment. Note that, in FIG. 4, the components same as in FIG. 1 are denoted by the same reference numerals as in FIG. 1, and detailed descriptions of the components are omitted.

In FIG. 4, each of the direct-current positive buses 20p and the direct-current negative buses 20n has a direct-current switch 21 connected in series. Current sensors 35 are connected to the respective diodes 34 of the grounding wires 33. Switches 36 are connected in series to the respective diodes 34 in the grounding wires 33. Alternating-current switches 42 are provided in the respective electric paths 40. A control unit 70A is provided on an upper level of the m electric-power converters 30A (system interconnection electric-power converter 3A).

Each of the direct-current switches 21 connects or disconnects the current path of the corresponding direct-current positive bus 20p or the corresponding direct-current negative bus 20n in response to a close instruction or an open instruction from the control unit 70A. When the direct-current switches 21 are opened, inflows of the direct currents supplied from the direct-current power supplies 10 to the electric-power converters 30A are cut off. Note that each of the direct-current switches 21 is an example of a first breaker of the claims.

The current sensors 35 detect the currents of the respective diodes 34. When a ground fault occurs in the embodiment illustrated in FIG. 4, values of the currents flowing through the diodes 34 are increased. The current sensors 35 can detect the currents at the time when the ground fault occurs, by detecting the currents of the respective diodes 34. Note that it is sufficient for the current sensors 35 to detect the currents flowing through the respective diodes 34, and installation positions of the current sensors 35 are not limited to positions illustrated in FIG. 4. Note that each of the current sensors 35 is an example of a current detector of the claims.

Each of the switches 36 connects or disconnects the current path of the corresponding grounding wire 33 in response to a close instruction or an open instruction from the control unit 70A. When the switches 36 are opened, inflows of ground-fault currents to the electric-power converters 30A through the grounding wires 33 are cut off. Note that each of the switches 36 is an example of a second breaker of the claims.

Each of the alternating-current switches 42 connects or disconnects the current path of the corresponding electric path 40 in response to a close instruction or an open instruction from the control unit 70A. The alternating-current switches 42 are provided in the respective electric paths 40 on the electric-power converter 30A side of the parallel connection point 41. When the alternating-current switches 42 are opened, inflows of the ground-fault currents to the electric-power converters 30A through the electric paths 40 and outflows of the ground-fault currents to the alternating-current power system through the electric paths 40 are cut off. Note that each of the alternating-current switches 42 is an example of a third breaker of the claims.

The control unit 70A controls operation of the power conversion system 1A, and controls operation of all of the electric-power converters 30A. The control unit 70A monitors the values of the current sensors 35 of the respective electric-power converters 30A, and determines whether a current exceeding a predetermined threshold flows through the diode 34 of any of the electric-power converters 30A. The threshold can be optionally set, and can be set to a value when the ground fault occurs. Accordingly, appropriately setting the threshold makes it possible to set ground fault detection to an appropriate level.

The control unit 70A monitors the values of the current sensors 35. When the control unit 70A determines that a current exceeding the predetermined threshold flows through the diode 34 of any of the electric-power converters 30A, the control unit 70A determines that the ground fault occurs. In contrast, when the control unit 70A determines that the current exceeding the predetermined threshold does not flow through the diode 34 of any of the electric-power converters 30A, the control unit 70A continues the monitoring as it is. When the control unit 70A determines that the ground fault occurs, the control unit 70A performs control by any of the following three methods.

In a first method, when determining that the ground fault occurs, the control unit 70A issues an open operation instruction to each of the direct-current switches 21. Each of the direct-current switches 21 disconnects the current path of the corresponding direct-current positive bus 20p or the corresponding direct-current negative bus 20n in response to the instruction from the control unit 70A. At this time, the control unit 70A issues the open operation instruction to all of the direct-current switches 21 once. This is because, for example, even in a case where the control unit 70A determines that the current sensor 35 provided in the electric-power converter 30A at a center in the drawing detects the current exceeding the predetermined threshold, the ground fault does not always occur in the electric-power converter 30A at the center in the drawing.

However, for example, in the case where the control unit 70A determines that the current sensor 35 provided in the electric-power converter 30A at the center in the drawing detects the current exceeding the predetermined threshold, probability of occurrence of the ground fault in the system of the electric-power converter 30A at the center in the drawing is high as compared with the other systems. Accordingly, the control unit 70A may open only the direct-current switch 21 of the electric-power converter 30A including the current sensor 35 that detects the current exceeding the predetermined threshold. This makes it possible to stop operation of only the system having high probability of occurrence of the ground fault as compared with the other systems, and to continue operation of the other systems.

In a second method, when determining that the ground fault occurs, the control unit 70A issues an open operation instruction to each of the switches 36. Each of the switches 36 disconnects the current path of the corresponding grounding wire 33 in response to the instruction from the control unit 70A. At this time, the control unit 70A may open all of the switches 36 once, or may open only the switch 36 of the electric-power converter 30A including the current sensor 35 that detects the current exceeding the predetermined threshold. The reason thereof is similar to the reason described in the first method.

In a third method, when determining that the ground fault occurs, the control unit 70A issues an open operation instruction to each of the alternating-current switches 42. Each of the alternating-current switches 42 disconnects the current path of the corresponding electric path 40 in response to the instruction from the control unit 70A. At this time, the control unit 70A may open all of the alternating-current switches 42 once, or may open only the alternating-current switch 42 of the system of the electric-power converter 30A including the current sensor 35 that detects the current exceeding the predetermined threshold. The reason thereof is similar to the reason described in the first method.

Note that, in the embodiment illustrated in FIG. 4, all types of the direct-current switches 21, the switches 36, and the alternating-current switches 42 are provided; however, one or more types thereof may be provided. In this case, the control unit 70A may perform control by using any of the first to third methods based on the type of provided switches. The control by the control unit 70A is not limited to the control using any one of the first to third methods. When two or more types of switches are provided, the control unit 70A may perform control by using two or more methods corresponding to the types of provided switches.

Further, in the embodiment illustrated in FIG. 4, all types of the direct-current switches 21, the switches 36, and the alternating-current switches 42 are provided; however, no switch may be provided. In this case, when the determining that the ground fault occurs, the control unit 70A may issue a warning indicating occurrence of the ground fault. This is because a worker or another controller may determine whether to cut off the current in response to occurrence of the ground fault. Even in the case where one or more types of the above-described switches are provided, when the control unit 70A may only issue a warning indicating occurrence of the ground fault when determining that the ground fault occurs.

Note that, in the embodiment illustrated in FIG. 4, for example, in the case where the direct-current power supplies 10 are the solar cells and the electric-power converters 30A each perform the independent MPPT control as in the embodiment illustrated in FIG. 1, the PID phenomenon may occur due to difference among quantities of solar radiation to the solar cells. As the countermeasures therefor, it is considered that the negative electrode sides of the electric-power converters 30A connected to the solar cells are grounded. However, in the case where the grounding method is the direct grounding method as in the comparative example illustrated in FIG. 2, the cross current 60 flows through the grounding wires 33.

On the other hand, in a case where the negative electrodes are not grounded, the direct-current sides of the electric-power converters 30A are in a non-grounded state. Therefore, impedance inserted between the direct-current side of each of the electric-power converters 30A and the earth GND is only a voltage-dividing resistor provided to measure the ground voltage on the direct-current side, and is high in resistance. As a method of detecting the ground fault, there is a method of detecting potential variation on the direct-current side caused by the ground fault. In the above-described case, however, a resistor between the direct-current side and the earth GND is high in resistance, and the potential on the direct-current side is largely varied by a slight leakage current to the earth GND. Accordingly, in the case where the negative electrodes are not grounded, the ground fault detection may become sensitive.

In contrast, in the embodiment illustrated in FIG. 4, the negative electrode sides of the electric-power converters 30A are grounded, but the diodes 34 are provided in the respective grounding wires 33, as in the embodiment illustrated in FIG. 1. Therefore, the possibility that the cross current 60 flows can be reduced as compared with the existing technique. Further, in the embodiment illustrated in FIG. 4, the control unit 70A monitors the values of the current sensors 35 of the electric-power converters 30A, and determines whether the ground fault occurs based on whether the current exceeding the predetermined threshold flows through any of the diodes 34. The threshold can be optionally set. Therefore, in the embodiment illustrated in FIG. 4, appropriately setting the threshold makes it possible to set the ground fault detection to the appropriate level as compared with the case where the negative electrodes are not grounded.

As described above, the embodiment illustrated in FIG. 4 exerts effects similar to the effects by the embodiment illustrated in FIG. 1. Further, in the embodiment illustrated in FIG. 4, the threshold for determination of the ground-fault current can be optionally selected. Therefore, the ground fault detection does not become sensitive, and detection sensitivity in the ground fault detection can be set to the appropriate level as compared with the case where the negative electrodes are not grounded. Furthermore, in the embodiment illustrated in FIG. 4, since the ground fault detection can be set to the appropriate level, the control unit 70A can appropriately cut off the ground-fault current as compared with the existing technique, by controlling any one type of the direct-current switches 21, the switches 36, and the alternating-current switches 42.

Third Embodiment

Figure 5:
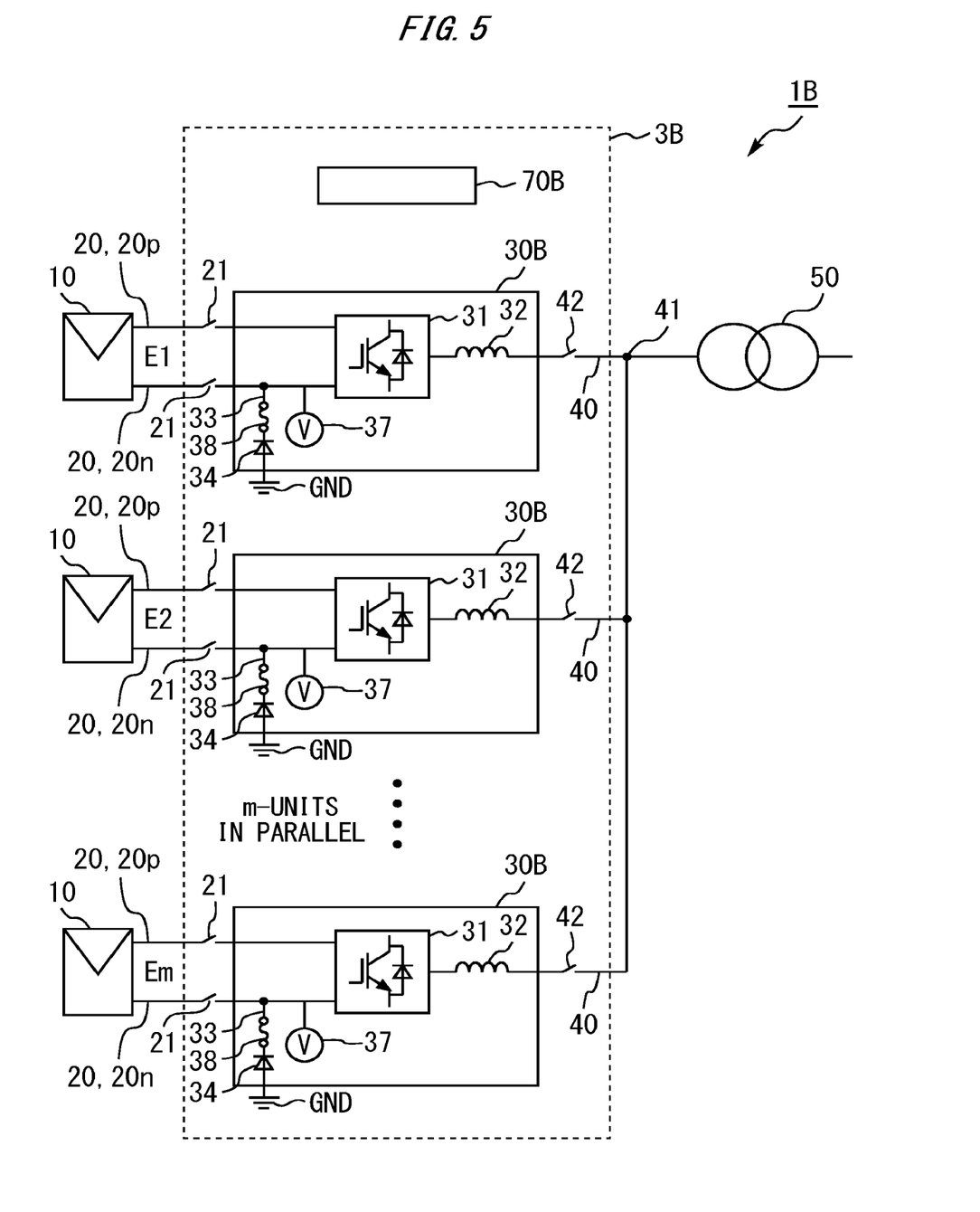
FIG. 5 is a diagram illustrating configurations of electric-power converters and a power conversion system including the electric-power converters according to a third embodiment.

FIG. 5 is a diagram illustrating configurations of electric-power converters 30B and a power conversion system 1B including the electric-power converters 30B according to a third embodiment. Note that, in FIG. 5, the components same as in FIG. 1 and FIG. 4 are denoted by the same reference numerals as in FIG. 1 and FIG. 4, and detailed descriptions of the components are omitted. In the embodiment illustrated in FIG. 4, the current sensors 35 are connected to the respective diodes 34 of the grounding wires 33, whereas in the embodiment illustrated in FIG. 5, in place of the current sensors 35, voltage sensors 37 are provided in the respective direct-current buses 20. Further, in the embodiment illustrated in FIG. 4, the switches 36 are connected in series to the respective diodes 34 in the grounding wires 33, whereas in the embodiment illustrated in FIG. 5, in place of the switches 36, fuses 38 are connected in series to the respective diodes 34 in the grounding wires 33. Further, in the embodiment illustrated in FIG. 4, the control unit 70A is provided, whereas in the embodiment illustrated in FIG. 5, in place of the control unit 70A, a control unit 70B is provided.

The voltage sensors 37 detects the direct-current voltages E of the respective direct-current buses 20. In the embodiment illustrated in FIG. 5, when the ground fault occurs, the currents flowing through the diodes 34 are increased. At this time, when currents each greater than or equal to a predetermined threshold flow through the diodes 34, the fuses 38 are blown out. When the fuses 38 are blown out, the potentials of the respective direct-current buses 20 are rapidly varied. The voltage sensors 37 detect rapid potential variations when the ground fault occurs, by detecting the voltage values of the direct-current buses 20. Note that it is sufficient for the voltage sensors 37 to detect potential variations of the respective direct-current buses 20, and installation positions of the voltage sensors 37 are not limited to positions illustrated in FIG. 5. Note that each of the voltage sensors 37 is an example of a voltage detector of the claims.

The fuses 38 are provided in series to the respective diodes 34 in the grounding wires 33, and are blown out when the currents each greater than or equal to the predetermined threshold flow through the respective grounding wires 33. The threshold at which the fuses 38 are blown out can be optionally changed by using the fuses 38 having different rated currents. Therefore, appropriately setting the rated currents of the fuses 38 makes it possible to set the ground fault detection to the appropriate level.

The control unit 70B controls operation of the power conversion system 1B, and controls operation of all of the electric-power converters 30B. The control unit 70B monitors the values of the voltage sensors 37 of the respective electric-power converters 30B, and determines whether potential variation exceeding a predetermined threshold occurs in the direct-current bus 20 of any of the electric-power converters 30B. The threshold can be optionally set, and can be set to a value when the ground fault occurs. Accordingly, appropriately setting the threshold makes it possible to set the ground fault detection to the appropriate level.

The control unit 70B monitors the values of the voltage sensors 37. When the control unit 70B determines that potential variation exceeding the predetermined threshold occurs in the direct-current bus 20 of any of the electric-power converters 30B, the control unit 70B determines that the ground fault occurs. In contrast, when the control unit 70B determines that potential variation exceeding the predetermined threshold does not occur in the direct-current bus 20 of any of the electric-power converters 30B, the control unit 70B continues the monitoring as it is. When the control unit 70B determines that the ground fault occurs, the control unit 70B performs control by any of the following three methods.

In a first method, when determining that the ground fault occurs, the control unit 70B issues an open operation instruction to each of the direct-current switches 21. Each of the direct-current switches 21 disconnects the current path of the corresponding direct-current positive bus 20p or the corresponding direct-current negative bus 20n in response to the instruction from the control unit 70B. At this time, the control unit 70B issues the open operation instruction to all of the direct-current switches 21 once. This is because, for example, even in a case where the fuse 38 provided in the electric-power converter 30B at a center in the drawing is blown out, the ground fault does not always occur in the electric-power converter 30B at the center in the drawing. In other words, this is because, for example, even in a case where the control unit 70B determines that the voltage sensor 37 of the electric-power converter 30B at the center in the drawing detects potential variation exceeding the predetermined threshold, the ground fault does not always occur in the electric-power converter 30B at the center in the drawing.

However, for example, in the case where the control unit 70B determines that the voltage sensor 37 provided in the electric-power converter 30B at the center in the drawing detects potential variation exceeding the predetermined threshold, probability of occurrence of the ground fault in the system of the electric-power converter 30B at the center in the drawing is high as compared with the other systems. Accordingly, the control unit 70B may open only the direct-current switch 21 of the electric-power converter 30B including the voltage sensor 37 that detects the potential variation exceeding the predetermined threshold. This makes it possible to stop operation of only the system having high probability of occurrence of the ground fault as compared with the other systems, and to continue operation of the other systems.

In a second method, when determining that the ground fault occurs, the control unit 70B issues an open operation instruction to each of the switches 36. Each of the switches 36 disconnects the current path of the corresponding grounding wire 33 in response to the instruction from the control unit 70B. At this time, the control unit 70B may open all of the switches 36 once, or may open only the switch 36 of the electric-power converter 30B including the voltage sensor 37 that detects the potential variation exceeding the predetermined threshold. The reason thereof is similar to the reason described in the first method.

In a third method, when determining that the ground fault occurs, the control unit 70B issues an open operation instruction to each of the alternating-current switches 42. Each of the alternating-current switches 42 disconnects the current path of the corresponding electric path 40 in response to the instruction from the control unit 70B. At this time, the control unit 70B may open all of the alternating-current switches 42 once, or may open only the alternating-current switch 42 of the system of the electric-power converter 30B including the voltage sensor 37 that detects the potential variation exceeding the predetermined threshold. The reason thereof is similar to the reason described in the first method.

Note that, in the embodiment illustrated in FIG. 5, all types of the direct-current switches 21, the switches 36, and the alternating-current switches 42 are provided; however, one or more types thereof may be provided as in the embodiment illustrated in FIG. 4. Further, in the embodiment illustrated in FIG. 5, no switch may be provided as in the embodiment illustrated in FIG. 4. The reason thereof and operation in that case are similar to those in the embodiment illustrated in FIG. 4.

As described above, the embodiment illustrated in FIG. 5 exerts effects similar to the effects by the embodiment illustrated in FIG. 1, as with the embodiment illustrated in FIG. 4. Further, in the embodiment illustrated in FIG. 5, the threshold for determination of the ground-fault current can be optionally selected as in the embodiment illustrated in FIG. 4. Therefore, the detection sensitivity in the ground fault detection can be set to the appropriate level as compared with the case where the negative electrodes are not grounded. Further, in the embodiment illustrated in FIG. 5, since the ground fault detection can be set to the appropriate level as in the embodiment illustrated in FIG. 4, it is possible to appropriately cut off the ground-fault current as compared with the existing technique.

Modification of Third Embodiment

Figure 6:
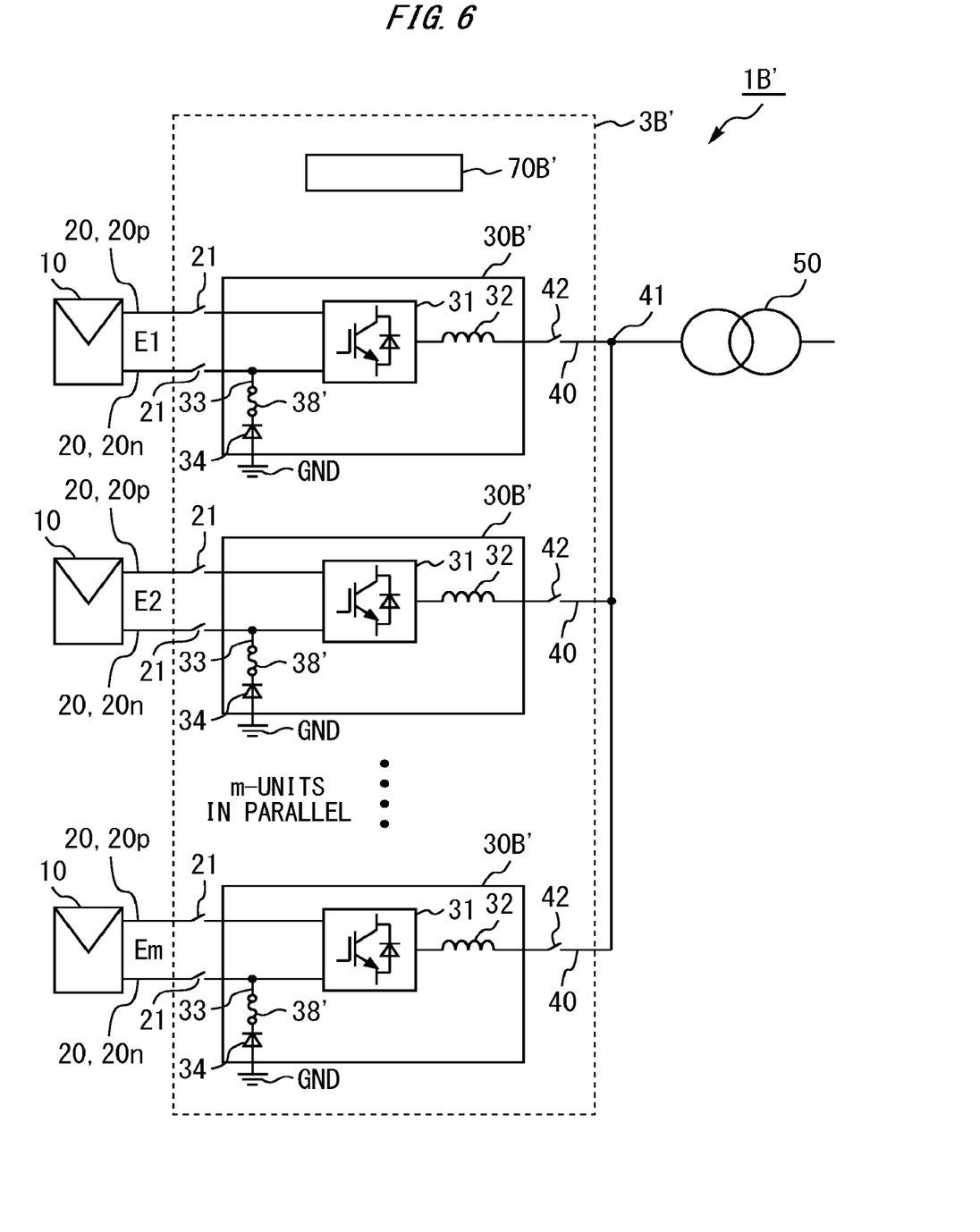
FIG. 6 is a diagram illustrating configurations of electric-power converters and a power conversion system including the electric-power converters according to a modification of the third embodiment.

FIG. 6 is a diagram illustrating configurations of electric-power converters 30B' and a power conversion system 1B' including the electric-power converters 30B' according to a modification of the third embodiment. Note that, in FIG. 6, the components same as in FIG. 5 are denoted by the same reference numerals as in FIG. 5, and detailed descriptions of the components are omitted.

In the embodiment illustrated in FIG. 5, the control unit 70B monitors the values of the voltage sensors 37 to detect potential variation occurring when any of the fuses 38 is blown out, thereby determining whether the ground fault occurs. In the embodiment illustrated in FIG. 6, the voltage sensors 37 are not provided, and fuses 38' are provided in place of the fuses 38. Further, in the embodiment illustrated in FIG. 6, a control unit 70B' is provided in place of the control unit 70B.

Each of the fuses 38' includes a switch operating when being blown out. The control unit 70B' monitors operation states of the switches held by the respective fuses 38', thereby determining whether the ground fault occurs. When the control unit 70B' determines that the switch held by any of the fuses 38' operates, the control unit 70B' determines that the ground fault occurs. The other configuration and operation in the embodiment illustrated in FIG. 6 is similar to the configuration and operation in the embodiment illustrated in FIG. 5. Note that the switch held by each of the fuses 38' is an example of a switch of the claims.

As described above, the embodiment illustrated in FIG. 6 exerts effects similar to the effects by the embodiment illustrated in FIG. 5.

Supplementary Notes of Embodiments

In the embodiments illustrated in FIG. 4 to FIG. 6, any one of the control units 70A, 70B, and 70B' (hereinafter, collectively referred to as "control unit 70") is provided; however, the number of control units 70 is not limited thereto. A plurality of control units 70 may be individually provided to each of the electric-power converters 30A, 30B or 30B'. In this case, each of the control units 70 may individually monitor the electric-power converter 30A, 30B or 30B' provided with the control unit 70 itself, and may determine whether the ground fault occurs in the electric-power converter 30A, 30B, of 30B' provided with the control unit 70 itself. In this case, the control unit 70 determining that the ground fault occurs may issue an open operation instruction only to the switch of the electric-power converter 30A, 30B, or 30B' provided with the control unit 70 itself. Further, the control unit 70 determining that the ground fault occurs may issue a warning to the electric-power converter 30A, 30B, or 30B' provided with the control unit 70 itself. In this case, effects similar to the effects by the embodiments illustrated in FIG. 4 to FIG. 6 are also exerted.

In the embodiment illustrated in FIG. 5, the control unit 70A detects the potential variations of the voltage sensors 37, and determines whether the fuses 38 are blown out, namely, whether the ground fault occurs; however, the determination is not limited thereto. In the embodiment illustrated in FIG. 5, the current sensors 35 may also be provided, and the control unit 70A may determine whether the fuses 38 are blown out, namely, whether the ground fault occurs, based on variations of the current values of the current sensors 35. In this case, effects similar to the effects by the embodiment illustrated in FIG. 5 are also exerted.

The embodiments illustrated in FIG. 1 and FIG. 4 to FIG. 6 are described as different embodiments; however, these embodiments may be appropriately combined. In this case, the direct-current switches 21, the switches 36, the current sensors 35, the voltage sensors 37, the fuses 38 and 38', the alternating-current switches 42, the control unit 70, and the like may be appropriately provided in combination.

The above detailed descriptions can clarify the features and the advantages of the embodiments. It is intended that the claims cover the features and the advantages of the embodiments as described above without departing from the spirit and the scope of the claims. Further, those skilled in the art may easily conceive of all improvements and alternations. Accordingly, there is no intention to limit the scope of the embodiments having inventiveness to those described above, and it is also possible to make suitable improvements and equivalents included in the scope disclosed in the embodiments.

REFERENCE SIGNS LIST 1, 1A, 1B, 1B' Power conversion system
3, 3A, 3B, 3B' System interconnection electric-power converter
10 Direct-current power supply
20 Direct-current bus
20p Direct-current positive bus
20n Direct-current negative bus
21 Direct-current switch
30, 30A, 30B, 30B' Electric-power converter
31 Power conversion circuit
32 Alternating-current reactor
33 Grounding wire
34 Diode
35 Current sensor
36 Switch
37 Voltage sensor
38, 38' Fuse
40 Electric path
41 Parallel connection point
42 Alternating-current switch
50 Interconnection transformer
60 Cross current
70, 70A, 70B, 70B' Control unit
E, E1, E2, Em Direct-current voltage
GND Earth
V1, V2, V3 Voltage

The invention claimed is:

1. An electric-power converter, comprising:
a plurality of direct-current power supplies;
a plurality of power conversion circuits provided corresponding to the respective direct-current power supplies, and configured to receive, from direct-current ends, direct-current power supplied from the respective corresponding direct-current power supplies through direct-current buses and to convert the direct-current power into alternating-current power;
an alternating-current power system configured to cause a plurality of alternating-current ends provided in the respective power conversion circuits to be directly connected in parallel through a parallel connection point, and to supply the alternating-current power output from the plurality of alternating-current ends to an alternating-current side through the parallel connection point;
a plurality of grounding wires each configured to connect at least two of a plurality of direct-current negative buses between the plurality of direct-current power supplies and the plurality of power conversion circuits, to earth; and
a plurality of diodes inserted in series into the respective grounding wires, and each including a cathode side connected to the corresponding direct-current negative bus and an anode side grounded.

2. The electric-power converter according to claim 1, further comprising:
a plurality of current detectors configured to detect currents flowing through the respective diodes; and
control circuitry configured to monitor the currents detected by the plurality of current detectors.

3. The electric-power converter according to claim 2, further comprising a plurality of first breakers inserted in series into the respective direct-current buses, and configured to disconnect the respective direct-current buses, wherein
when any of the plurality of current detectors detects current, the control circuitry issues an open operation instruction to the plurality of first breakers.

4. The electric-power converter according to claim 2, further comprising a plurality of second breakers inserted into the respective grounding wires in series to the respective diodes, and configured to disconnect the respective grounding wires, wherein
when any of the plurality of current detectors detects current, the control circuitry issues an open operation instruction to the plurality of second breakers.

5. The electric-power converter according to claim 2, further comprising third breakers inserted into respective electric paths of the alternating-current power system, and configured to disconnect the respective electric paths, wherein
when any of the plurality of current detectors detects current, the control circuitry issues an open operation instruction to the third breakers.

6. The electric-power converter according to claim 1, further comprising:
a plurality of fuses inserted into the respective grounding wires in series to the respective diodes, and configured to be blown out when a current greater than or equal to a predetermined threshold flows through the respective diodes;
a plurality of voltage detectors configured to detect potential variations of the direct-current power at the respective direct-current ends; and
control circuitry configured to monitor the potential variations detected by the plurality of voltage detectors when the fuses are blown out.

7. The electric-power converter according to claim 6, further comprising a plurality of first breakers inserted in series into the respective direct-current buses, and configured to disconnect the respective direct-current buses, wherein
when any of the plurality of voltage detectors detects the potential variation, the control circuitry issues an open operation instruction to the plurality of first breakers.

8. The electric-power converter according to claim 6, further comprising a plurality of second breakers inserted into the respective grounding wires in series to the respective diodes, and configured to disconnect the respective grounding wires, wherein
when any of the plurality of voltage detectors detects the potential variation, the control circuitry issues an open operation instruction to the plurality of second breakers.

9. The electric-power converter according to claim 6, further comprising third breakers inserted into respective electric paths of the alternating-current power system, and configured to disconnect the respective electric paths, wherein
when any of the plurality of voltage detectors detects the potential variation, the control circuitry issues an open operation instruction to the third breakers.

10. The electric-power converter according to claim 1, further comprising:
a plurality of fuses inserted into the respective grounding wires in series to the respective diodes, and configured to be blown out when a current greater than or equal to a predetermined threshold flows through the respective diodes;
a plurality of switches provided in the respective fuses, and configured to be opened when the fuse provided with the switch itself is blown out; and
control circuitry configured to monitor open operation of the switches.

11. The electric-power converter according to claim 1, wherein the direct-current power supplies are solar cells.

12. The electric-power converter according to claim 3, further comprising a plurality of second breakers inserted into the respective grounding wires in series to the respective diodes, and configured to disconnect the respective grounding wires, wherein
when any of the plurality of current detectors detects the current, the control circuitry issues an open operation instruction to the plurality of second breakers.

13. The electric-power converter according to claim 3, further comprising third breakers inserted into respective electric paths of the alternating-current power system, and configured to disconnect the respective electric paths, wherein
when any of the plurality of current detectors detects the current, the control circuitry issues an open operation instruction to the third breakers.

14. The electric-power converter according to claim 4, further comprising third breakers inserted into respective electric paths of the alternating-current power system, and configured to disconnect the respective electric paths, wherein
when any of the plurality of current detectors detects the current, the control circuitry issues an open operation instruction to the third breakers.

15. The electric-power converter according to claim 7, further comprising a plurality of second breakers inserted into the respective grounding wires in series to the respective diodes, and configured to disconnect the respective grounding wires, wherein
when any of the plurality of voltage detectors detects the potential variation, the control circuitry issues an open operation instruction to the plurality of second breakers.

16. The electric-power converter according to claim 7, further comprising third breakers inserted into respective electric paths of the alternating-current power system, and configured to disconnect the respective electric paths, wherein
when any of the plurality of voltage detectors detects the potential variation, the control circuitry issues an open operation instruction to the third breakers.

17. The electric-power converter according to claim 8, further comprising third breakers inserted into respective electric paths of the alternating-current power system, and configured to disconnect the respective electric paths, wherein
when any of the plurality of voltage detectors detects the potential variation, the control circuitry issues an open operation instruction to the third breakers.

18. The electric-power converter according to claim 2, wherein the direct-current power supplies are solar cells.

19. The electric-power converter according to claim 3, wherein the direct-current power supplies are solar cells.

20. The electric-power converter according to claim 4, wherein the direct-current power supplies are solar cells.

* * * * *